United States Patent [19]

Hansen

[11] Patent Number: 5,710,412

[45] Date of Patent: Jan. 20, 1998

[54] FLUID TOOLING FOR THERMOPLASTIC WELDING

[75] Inventor: Karl A. Hansen, deceased, late of Seattle, Wash., by John J. Dejong, executor

[73] Assignee: The Boeing Company, Seattle, Wash.

[21] Appl. No.: 367,557

[22] Filed: Jan. 3, 1995

Related U.S. Application Data

[63] Continuation-in-part of Ser. No. 314,027, Sep. 28, 1994, Pat. No. 5,508,496.

[51] Int. Cl.[6] .................................................. H05B 6/10
[52] U.S. Cl. ........................ 219/633; 219/614; 219/617; 219/645
[58] Field of Search .................................. 219/600, 618, 219/633–635, 644, 645, 647, 651, 658, 659, 614, 617, 759, 649, 656, 670; 156/272.2, 272.4, 379.8, 380.2, 380.5

[56] References Cited

U.S. PATENT DOCUMENTS

| | | |
|---|---|---|
| 2,241,312 | 5/1941 | Luty . |
| 2,273,423 | 2/1942 | Somes . |
| 2,372,929 | 4/1945 | Blessing . |
| 2,378,801 | 6/1945 | Sidell et al. . |
| 2,423,922 | 7/1947 | Arndt, Jr. . |
| 2,589,777 | 3/1952 | Collins . |
| 2,739,829 | 3/1956 | Pedlow et al. . |
| 2,761,941 | 9/1956 | Ardichvili . |
| 2,898,435 | 8/1959 | Crafts . |
| 3,061,503 | 10/1962 | Gould et al. . |
| 3,101,403 | 8/1963 | Lewis et al. . |
| 3,183,460 | 5/1965 | Bennon . |
| 3,288,979 | 11/1966 | Mills et al. . |
| 3,395,261 | 7/1968 | Leatherman et al. . |
| 3,427,421 | 2/1969 | Matheson et al. . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |

(List continued on next page.)

FOREIGN PATENT DOCUMENTS

| | | |
|---|---|---|
| 0 228 719 | 7/1987 | European Pat. Off. . |
| 0 461 979 B1 | 4/1994 | European Pat. Off. . |
| 54-25542 | 2/1979 | Japan . |
| 58-059039 | 4/1983 | Japan . |

OTHER PUBLICATIONS

J. Giachino, Welding skills and Practices, Am. Tech. Soc., Chicago, IL (1960,1965,1967,1971,1974,1976) 393–401.

*Primary Examiner*—Tu B. Hoang
*Attorney, Agent, or Firm*—John C. Hammar

[57] ABSTRACT

Fluid tooling for use in an inductive welding system for creating a fusion bond along a bond line between two thermoplastic parts includes an elongated vessel made of fluid impervious flexible material and having an elongated axis and an open end at each axial end of the vessel, closed and sealed by end closures. A coil is received in the vessel for generating an alternating magnetic field transverse to the longitudinal axis. A linear guide in the vessel extends axially for substantially the full length of the vessel and guides the coil for movement axially through the vessel. Power leads are connected to the coil and extend through a pass-through in one end closure to connect the coil to a source of high frequency electrical power of about 35 KHz to energize the coil to produce an alternating magnetic field. A pair of magnets guided along opposite sides of the vessel and magnetically coupled to a ferromagnetic mass connected to the coil move the coil axially along the vessel over the bond line at a controlled speed. A backup structure exerts a downward force along the top of the vessel, pressurizing fluid sealed in the vessel and distributing pressure uniformly over the top surface of the top part to press the top part against the bottom part and facilitate fusion bonding of the thermoplastic in the faying surfaces of the interface.

20 Claims, 2 Drawing Sheets

U.S. PATENT DOCUMENTS

| | | |
|---|---|---|
| 3,946,349 | 3/1976 | Haldeman, III . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,067,765 | 1/1978 | Heller et al. . |
| 4,091,254 | 5/1978 | Struve . |
| 4,120,712 | 10/1978 | Sindt . |
| 4,180,717 | 12/1979 | Lenk et al. . |
| 4,288,673 | 9/1981 | Ishibashi . |
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,355,222 | 10/1982 | Geithman et al. . |
| 4,382,113 | 5/1983 | Schwartz et al. . |
| 4,416,713 | 11/1983 | Brooks . |
| 4,421,588 | 12/1983 | Davies . |
| 4,445,951 | 5/1984 | Lind et al. . |
| 4,489,123 | 12/1984 | Schijve et al. ............... 428/213 |
| 4,521,659 | 6/1985 | Buckley et al. . |
| 4,541,891 | 9/1985 | Leatherman ................ 156/379.6 |
| 4,642,155 | 2/1987 | Ramsey ........................... 156/359 |
| 4,653,396 | 3/1987 | Wennerberg . |
| 4,671,470 | 6/1987 | Jonas ................................ 244/119 |
| 4,673,450 | 6/1987 | Burke . |
| 4,684,417 | 8/1987 | Grandclement ..................... 156/64 |
| 4,768,433 | 9/1988 | Boissevain . |
| 4,791,260 | 12/1988 | Waldman . |
| 4,822,972 | 4/1989 | Sugioka et al. . |
| 4,897,518 | 1/1990 | Mucha et al. . |
| 4,904,972 | 2/1990 | Mori et al. . |
| 4,919,759 | 4/1990 | Ilmarinen et al. . |
| 4,947,464 | 8/1990 | Mori et al. . |
| 4,978,825 | 12/1990 | Schmidt et al. . |
| 5,001,319 | 3/1991 | Holmstrom . |
| 5,047,605 | 9/1991 | Ogden . |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,240,542 | 8/1993 | Miller et al. ................... 156/272.4 |
| 5,248,864 | 9/1993 | Kodokian . |
| 5,250,776 | 10/1993 | Pfaffmann . |
| 5,283,409 | 2/1994 | Brendel et al. . |
| 5,313,034 | 5/1994 | Grimm et al. . |
| 5,313,037 | 5/1994 | Hansen et al. . |
| 5,486,684 | 1/1996 | Peterson et al. ................. 219/633 |
| 5,508,496 | 4/1996 | Hansen et al. ................... 219/633 |

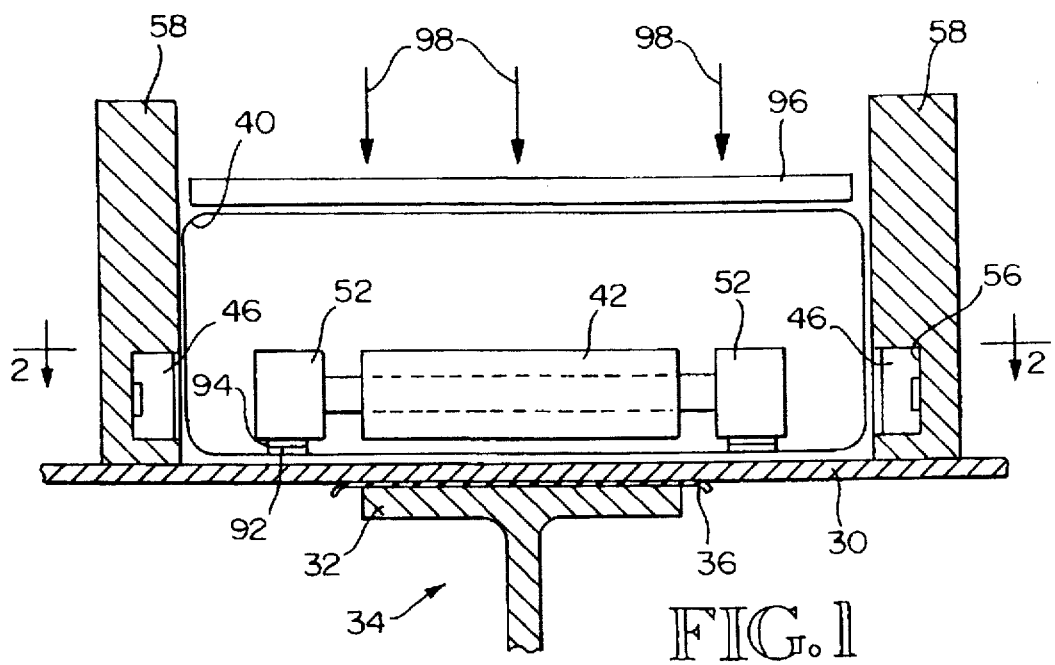
FIG. 1
FIG. 2
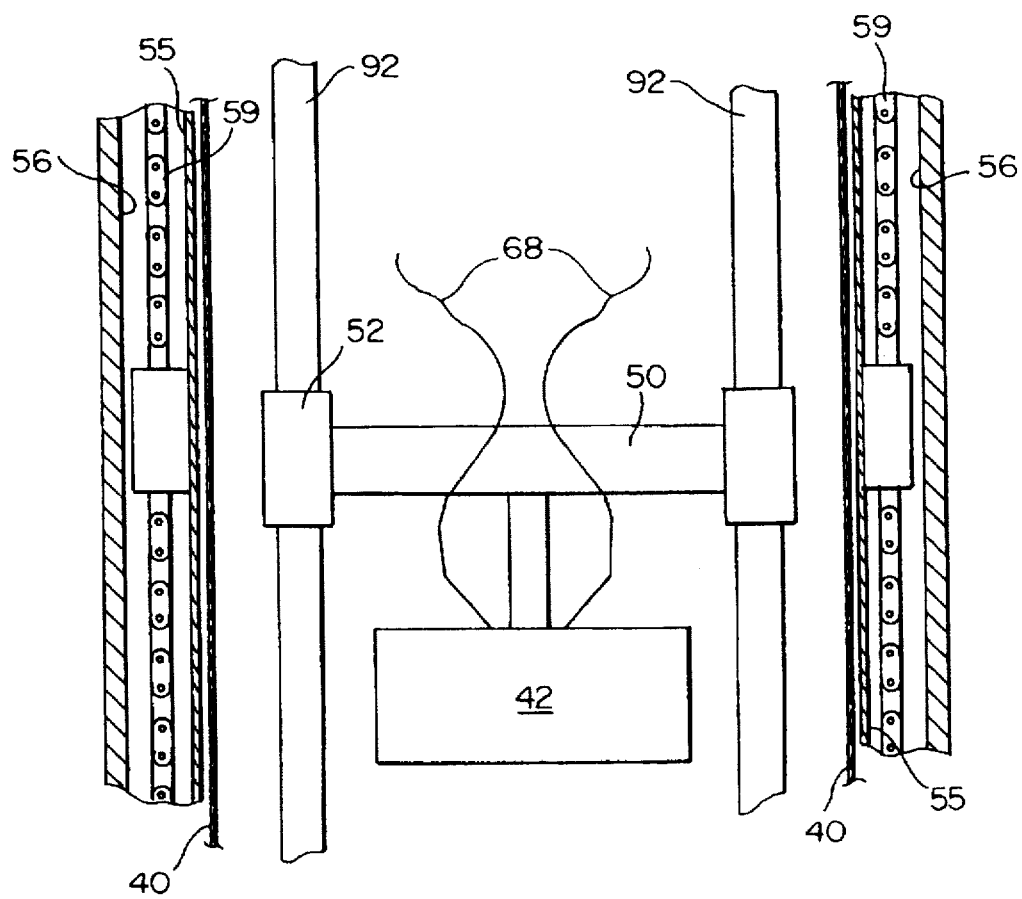

FLUID TOOLING FOR THERMOPLASTIC WELDING

REFERENCE TO RELATED APPLICATIONS

The present application is a continuation-in-part application based upon U.S. patent application Ser. No. 08/314,027, filed Sep. 28, 1994, now U.S. Pat. No. 5,508,496.

TECHNICAL FIELD

This invention relates to conformal tooling for exerting pressure to a contoured surface of a part while applying a magnetic field for inductive welding of that part to another part, and more particularly to a conformal tooling system used to apply a uniform pressure field to a top part during inductive heating of a conductive susceptor between the top part and an underlying part to which the top part is to be inductively welded by fusion bonding.

BACKGROUND OF THE INVENTION

The conventional technique of attaching parts together to form large assemblies in the aerospace industry is with the use of fasteners, such as rivets, bolts, lockbolts, etc. Installation of fasteners is a laborious process, requiring of drilling holes, installing fasteners and securing the fastener, usually one at a time. A significant percentage of the cost of a final assembly, such as a wing box, that is fastened together using conventional fasteners, is in the costs of fastener installation and the inevitable rework and scrap that results for the use of fasteners. Enormous resources have been devoted to improving the quality and reliability of fastener installation and to reducing the associated costs, but it remains a troublesome technology, long overdue for radical improvement.

Fusion bonding, or "welding" of thermoplastic composite material, such as polyimide impregnated graphite, is an emerging technology of great promise in the aerospace field for reducing the cost of fastening parts, such as wing spars, ribs and wing skins, together to make large assemblies, such as a wing box. As the use of plastic parts increases in the aerospace field and as their long-term performance becomes better understood, plastic parts will gradually replace aluminum parts and the assembly technologies will assume great economic significance in the aerospace industry. Even today, where plastic parts are widely used of fighter aircraft, fastener technologies have a substantial influence on the cost of the final product.

An apparatus and method for performing welding of thermoplastic composite material is described in U.S. patent application Ser. No. 08/352,991. The method described in the Mittleider application uses a conductive foraminous susceptor at the interface between two parts to be welded together. Eddy currents in the susceptor, induced by an alternating magnetic field generated by an induction coil, heat the susceptor by resistive heating and raise the temperature of the thermoplastic in the faying surfaces of the two parts in contact with the susceptor to the thermoplastic melt point. Pressure is applied to squeeze the two parts together, pressing the melted thermoplastic through and around the interstices of the susceptor and promoting molecular diffusion of the faying surfaces to form a bond region that is continuous and uniform from one part to the other with no discernible junction between the two parts, other than the embedded susceptor.

The pressure in the Mittleider system is applied with the use of a "skate" that supports the coil and applies pressure on the parts with the use of a pressure pad on each side of the coil. The skate is pulled over the parts along the band to be welded and the two pressure pads on either side of the coil press against the top part while the coil in the center heats the interface between the parts, creating a melt pool in which the thermoplastic from the faying surfaces of the two parts commingle under the pressure exerted by the pressure pads to form a bond region with no discernible junction line between the two parts. The reaction force exerted by the skate in the direction opposite to the force exerted by the pressure pads is borne by a pair of headers which guide and support the skate as it is pulled along over the parts.

Although the skate in the Mittleider system works well in the wing box assembly jig described in the aforesaid application, there may be some applications in which a simpler system would be preferable. Where the contour of the top part is more complex, or in applications involving a faster speed of motion of the coil, a tooling system that is capable of applying uniform and constant pressure on the parts could be advantageous.

Thus, the an of thermoplastic welding would be advanced by a tooling system for applying continuous and uniform pressure to the top part of two parts to be fusion bonded by inductive welding using a moving coil.

SUMMARY OF THE INVENTION

The present invention provides an improved tooling system for applying constant and uniform pressure to press the top part of two parts to be inductively welded while a coil moves along the surface of the parts in the path of the pressure footprint exerted by the tooling system to produce a magnetic field that generates eddy currents in a susceptor in the interface between the parts, resistively heating the susceptor and melting the faying surfaces of the parts which intermingle in and around the susceptor to form a diffused bond region without a discernible junction line between the parts. The present invention also provides an improved fluid pressurized tooling system for applying constant and uniform pressure to press the top part of two parts to be inductively welded while a coil moves through the core of the tooling where it is guided and is cooled by the fluid that pressurizes the tooling.

These and other features of the invention are attained in fluid tooling for use in an inductive welding system for creating a fusion bond along a bond line between two thermoplastic parts. The fluid tooling includes an elongated vessel made of fluid impervious flexible material. The vessel has an elongated axis and an open end at each axial end of the vessel, and has a cross sectional dimension sized to accommodate a coil for generating an alternating magnetic field transverse to the longitudinal axis. Each axial end of the vessel is closed and sealed by an end closure. One of the end closures is removable for insertion of the coil into the vessel. A linear guide in the vessel extends axially for substantially the full length of the vessel and guides the coil for movement axially through the vessel. Power leads are connected to the coil and extend through a pass-through in one end closure to connect the coil to a source of high frequency electrical power of about 35 KHz to energize the coil to produce an alternating magnetic field. A motive system is provided for moving the coil axially along the vessel over the bond line at a controlled speed. The motive system includes a pair of magnets guided along opposite sides of the vessel and magnetically coupled to a ferromagnetic mass connected to the coil. The magnets are moved along their guides and pull the coil attached to the ferromagnetic mass inside the fluid tooling. A backup structure exerts a downward force along the top of the vessel, pressurizing fluid sealed in the vessel and distributing pressure uniformly over the top surface of the top part to press the top part against the bottom part and facilitate fusion bonding of the thermoplastic in the faying surfaces of the interface.

DESCRIPTION OF THE DRAWINGS

FIG. 1 is a sectional elevation from one end of a fluid tooling system for welding two thermoplastic pads together in accordance with this invention;

FIG. 2 is a plan view of the fluid tooling system along lines 2—2 in FIG. 1.

DESCRIPTION OF THE PREFERRED EMBODIMENT

Figure 3:
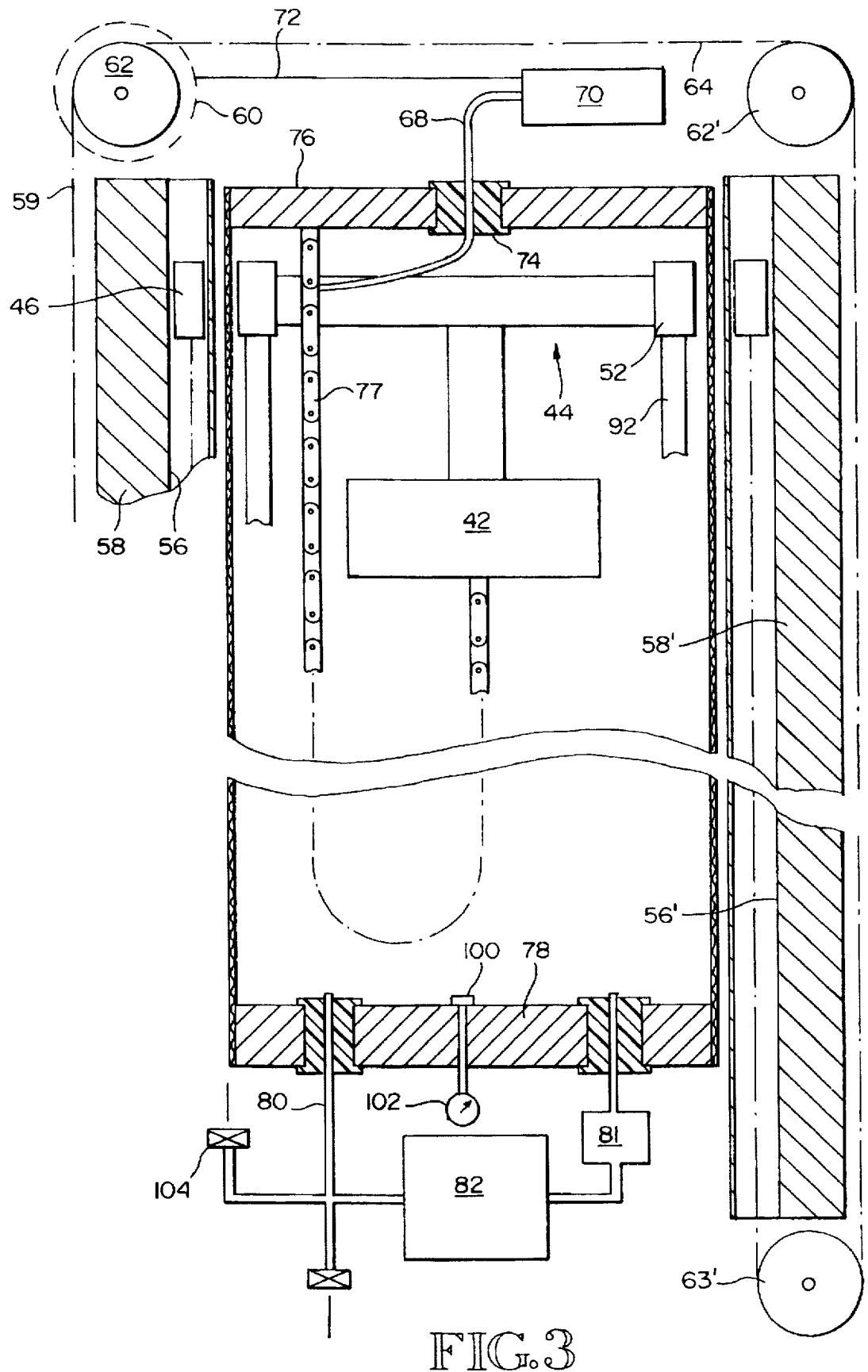
FIG. 3 is a sectional plan view of the fluid vessel shown in FIG. 1, showing a schematic diagram of the drive mechanism for the motive system for moving the coil in the vessel.

Turning now to the drawings, wherein like reference characters refer to identical or corresponding structures, and more particularly to FIG. 1 thereof, a fluid tooling system is shown for use in inductive welding of thermoplastic pads. Illustrative parts shown in FIG. 1 are a wing skin 30 being welded to the cap 32 of a wing spar 34. A coil 42 positioned over the spar cap 32 is energized by high power, high frequency electric current at about 35 KHz to generate an alternating magnetic field which propagates through the wing skin 30 and into the interface between the wing skin 30 and the spar cap 32. The magnetic field induces eddy currents in a conductive foraminous susceptor 36 in the interface which resistively heats the susceptor and the faying surfaces of the thermoplastic parts. The parts are pressed together, causing the softened or melted thermoplastic of the two faying surfaces to intermingle and "heal" together in a bond region having no discernible junction line, other than the embedded susceptor. An apparatus and method for performing such a thermoplastic weld is described in the aforesaid Mittleider application, the disclosure of which is incorporated herein by reference.

This invention applies pressure to the top part 30 using a fluid filled vessel 40 made of flexible fluid-impervious material. The material typically has a liner of flexible polymer such as polyurethane or neoprene that is unaffected by a high power magnetic field. The polymer liner is reinforced with an inelastic fiber such as hemp, Kevlar or the like to strengthen the vessel 40 and prevent it from extruding from its confined area under fluid pressure.

The vessel 40 is dimensioned to receive a coil 42 and a ferromagnetic hammerhead 44 for following a pair of permanent drive magnets 46 of a motive system. The coil 42 can be a cup coil as shown in U.S. Pat. No 5,313,037 entitled "High Power Induction Work Coil for Small Strip Susceptors" issued to Karl Hansen and C. David Lunden on May 17, 1994, the disclosure of which is incorporated herein by reference. Another preferred coil assembly is shown in U.S. Pat. No. 5,444,220 which is incorporated by reference.

The hammerhead 44 includes a stand-off T-bar 50 that connects the coil 42 with an identical pair of ferromagnetic masses 52. The masses 52 are positioned by the T-bar 50 forward and laterally outward from the coil position, and are located adjacent the side wall of the vessel 40. The drive magnets 46 are mounted for linear movement parallel to the axis of the vessel 40 just outside of the vessel 40 at a position adjacent to the masses 52 to facilitate magnetic coupling of the magnets 54 with the masses 52. The stand-off T-bar 50 off sets the coil 42 from the ferromagnetic masses 52 and the drive magnets 46 by a distance that is sufficient to prevent any significant disruption to the magnetic field generated by the coil 42.

The drive magnets 46 may be mounted in any convenient manner for linear motion along the outside of the vessel 40, such as attaching the magnets to linear bearings engaged with linear guide tracks secured to opposite sides of the vesel. In this embodiment, however, the magnets 46 are mounted in slots 56 milled in the inside surfaces of a pair of headers 58 mounted over the wing skin 30 on either side of the spar cap 32, as shown in FIG. 1. The slots 56 are covered by a thin, rigid, non-magnetic plate 55 that prevents the pressure in the vessel from forcing the vessel wall against the magnets 46 and jamming the magnets in the slots 56, but does not interfere with the magnetic field of the magnets 46. Alternatively, the magnets could be fitted into a cylindrical conduit set into a semi-cylindrical slot milled into the inside surfaces of the headers 58 to support the pressure exerted by the vessel 40 so that the magnets 46 may slide freely in the axial direction of the vessel to move the coil 42.

The motive system for moving the coil in the vessel, shown in FIG. 3, further includes a chain 59 and pulley system for pulling the magnets 46 axially along in the slots 56. The chain and pulley system can be similar to the same device shown in the aforesaid Mittleider application, including a stepper motor 60 driving a double sprocket 62 mounted at one end of the headers 58, and through a short drive chain 64, driving a second double sprocket 62' mounted on the same end of the other header 58'. Motive chains 58 and 58' are trained around the sprockets 62 and 62' and around single sprockets 63 and 63' at the other end of the headers 58 and 58' to form two continuous loops in which the drive magnets are connected for movement along the slots 56. The magnets 46 are pulled along the slots 56 by the pair of chain loops 59 and 59' driven by the stepper motor 60.

The coil is energized by power leads 68 which are connected at one end to a control unit 70 and at the other end to the coil 42. The control unit can be the same control unit shown in the Mittleider application and also controls the stepper motor 60 through power leads 72. The power leads 68 to the coil 42 are routed through a sealed pass-through 74 in a removable end cap 76 which can be removed to permit insertion of the coil and hammerhead assembly, and then replaced to seal the end of the vessel 40. The power leads may be routed within the vessel with a conventional cable carrier 77 attached to the end cap 76 adjacent the pass-through 74. The end cap can be fitted to the vessel in any suitable manner, such as the pressure fitting on the end of a fire hose. The other end of the vessel 40 can be fitted with a similar end cap 78 adapted to receive fluid lines 80 for filling the vessel with fluid, for circulating the fluid with a pump 81 through a heat exchanger 82, and draining the vessel after use.

Other devices are possible for moving the coil 42 through the vessel 40. For example, a simple rod extending through an end cap would suffice for applications requiring only a short length of travel of the coil 42. The rod could hold the power leads for the coil 42 and could be driven by any suitable mechanism such as a ball screw driven by a servo motor.

The movement of the coil 42 in the vessel 40 is guided by a pair of guide tracks 92 along which a set of linear bearings 94 travel. The tracks 92 are mounted on the inner wall of the vessel 40 and extend parallel to the axis of the vessel for its entire length. The linear bearings are attached to the ferromagnetic masses 52 and guide the assembly of the coil and hammerhead 44 in a precise linear path along the axis of the vessel exactly over the centerline of the spar cap 32.

A backup structure 96 is positioned over the top of the vessel 40 and is forced down against the vessel 40 as indicated by arrows 98 to force the bottom of the vessel 40 against the top surface of the top part 30. A pressure sensor 100 is coupled through the end cap 78 to a pressure gauge 102 to give an indication of the pressure exerted against the top part 30, and the pressure sensor 100 may be coupled electrically by conductors (not shown) to the control system 70 for automatic control of the force exerted by the backup structure 96 against the vessel 40.

In operation, the coil 42 and hammerhead assembly 44 is inserted into the vessel and the end caps 76 and 78 are secured to the vessel, sealing it securely against high pressure. The vessel 40 is positioned between the headers 58 and 58' over the parts 30 and 32 to be welded. A cooling liquid such as water is admitted into the vessel 40 through a valve 104 until all the air is expelled from the vessel through an air exhaust valve (not shown) positioned in the end cap 76 at the highest level of the vessel 40, as indicated by water squirting from the air exhaust valve. The air exhaust valve is closed and the backup structure is positioned over the vessel 40 and brought down and forced against the vessel 40 with enough force to raise the pressure in the vessel to the desired level, as indicated by the pressure gauge 102.

Electrical power is applied to the coil and the stepper motor 60 is started to draw the drive magnets along the slots 56 and 56' in the headers 58 and 58'. The coil generates an alternating magnetic field that propagates through the top part 30 and around the susceptor 36 in the interface between the two parts. The magnetic field induces eddy currents in the susceptor 36 which resistively heat the susceptor and the thermoplastic in the faying surfaces of the two parts 30 and 32.

The speed of motion of the coil is determined by the depth of heating of the faying surfaces desired and the power dissipated in the susceptor. High power to the susceptor makes possible higher processing speeds but carries the risk of over heating the thermoplastic. High power processing requires precise controls and an interactive control system capable of making adjustments to the power level or coil speed during welding. The temperature of the susceptor can be determined by thermocouples buried in the interface, or electronically by measuring the impedience changes caused by the temperature coefficient of resistance of the susceptor as it is heated inductively, as described in U.S. Pat. No. 5,573,613.

The pressure exerted by the vessel 40 against the top of the top part 30 presses the two parts together and causes the melted or softened thermoplastic material from the two faying surfaces to flow through the openings in the susceptor and to intermingle and blend together to form a uniform bond region with no discernible junction line between the two parts other than the susceptor 36. The pressure exerted by the vessel remains constant and is unaffected by extrusion of thermoplastic from the bond line or by dimensional changes caused by changes in temperature of the parts as they are inductively heated. The pressure remains constant even after the coil has passed, thereby ensuring against relaxation of the bond line during high speed welding after the coil has passed but before the thermoplastic has rehardened.

Obviously, numerous modifications and variations of the preferred embodiment described will occur to those skilled in the art. Accordingly, it is expressly to be understood that these modifications and variations, and the equivalents thereof, may be practiced while remaining within the spirit and scope of the invention as defined by the following claims, wherein I claim:

What is claimed is:

1. A fluid tooling system for welding a thermoplastic weld at a bond line between two thermoplastic parts, comprising:

an induction coil;

an elongated vessel made of fluid impervious flexible material, the vessel having a longitudinal axis and an open end at each axial end and having a cross-sectional dimension sized to accommodate the coil for generating an alternating magnetic field transverse to the longitudinal axis;

an end closure sealing each axial end, at least one of the end closures being removable for insertion of the coil into the vessel;

a linear guide in the vessel extending axially for substantially the full length of the vessel engaging the coil for guiding the coil;

power leads, connected to the coil and extending through a pass-through formed into the vessel for providing electrical power to the coil;

a motive system for moving the coil axially along the vessel over the bond line at a controlled speed while applying electrical power to the coil to form the thermoplastic weld by inductive heating along the bond line;

a backup structure for exerting a downward force along the vessel; and pressurizing fluid sealed in the vessel for distributing pressure uniformly over one part to press that part against the other part and to facilitate formation of the thermoplastic weld.

2. A fluid tooling system as defined in claim 1, wherein:

said fluid impervious flexible material includes a fluid impervious polymer and a reinforcing flexible inelastic fabric material.

3. A fluid tooling system as defined in claim 1, wherein:

said linear guide includes a track extending axially along the entire length of said vessel and engaged with linear bearings operatively connected to said coil.

4. A fluid tooling system as defined in claim 1, further comprising:

a heat exchanger connected to said vessel by fluid lines, and a pump connected by fluid lines between said heat exchanger and said vessel for circulating fluid from said vessel, through said heat exchanger, and back to said vessel for extracting heat from said fluid absorbed thereby from said coil.

5. A fluid tooling system as defined in claim 1, further comprising:

a pressure sensor in said vessel, coupled to a pressure indictor for indicator fluid pressure in said vessel.

6. A fluid tooling system as defined in claim 1, wherein:

the motive system includes a ferromagnetic mass connected to the coil and a magnet on the outside of the vessel couples magnetically through the flexible material of the vessel with the ferromagnetic mass; and a driver connected to the magnet for moving the magnet at a controlled speed in the direction of the vessel axis for moving the magnet and the ferromagnetic mass and thereby moving the coil axially along the vessel.

7. A fluid tooling system as defined in claim 6, wherein:
said coil is axially offset from said ferromagnetic mass and said magnets; whereby magnetic disruptions caused by said magnetic mass and said magnets to said magnetic field of said coil are minimized.

8. A fluid tooling system as defined in claim 1, wherein:
said backup structure includes a rigid mechanical structure having a contour in contact with said vessel substantially equal to the contour of said parts.

9. A fluid tooling system as defined in claim 7, further comprising:
a side wall on each side of said vessel for confining said vessel within a predetermined space and for aligning said backup structure vertically over said vessel.

10. A process for thermoplastic welding a top thermoplastic part to a bottom thermoplastic part along a bond line formed by fused faying surfaces at an interface between the parts, comprising:
interposing a conductive foraminous susceptor along the interface;
installing an induction coil in an elongated vessel made of fluid impervious flexible material, said vessel having opposite axial ends and a closure at each end;
sealing said vessel at both axial ends and filling said vessel with fluid;
positioning said vessel over said interface and exerting a force along said vessel to press said vessel against said top part;
applying electrical power to a power lead connected to said coil through a sealed pass-through in said vessel to electrically energize said coil to produce an alternating magnetic field that propagates through said vessel and around said susceptor in said interface;
inducing eddy currents in said susceptor with said magnetic field and resistively heating said susceptor with said eddy currents to soften said thermoplastic in said faying surfaces;
moving said coil axially along said vessel while inducing said eddy currents in said susceptor with said magnetic field to create a moving melt pool of said thermoplastic in said faying surfaces while exerting said force on said vessel to press said vessel against one part and thereby press said faying surface of that part with a uniformly distributed pressure against said faying surface of the other part and to hold said parts in contact while said softened thermoplastic in both faying surfaces infuses through the susceptor and interdiffuses together into a continuous thermoplastic weld.

11. The process of claim 10, wherein:
said moving step includes moving a pair of magnets, guided along both sides of said vessel, in an axial direction along said vessel and attracting a ferromagnetic mass attached to said coil in the axial direction.

12. A process for inductive welding as defined in claim 10, further comprising:
guiding said coil in said vessel axially along the length of said vessel over said interface.

13. The process of claim 12, wherein:
said guilding step includes engaging a linear bearing operatively attached to said coil with a guide track mounted axially in said vessel.

14. A process for inductive welding as defined in 10, further comprising:
cooling said coil with said fluid in said vessel; and
extracting heat from said fluid heated by said coil by circulating said fluid through a heat exchanger.

15. Tooling for forming a thermoplastic weld along a bond line between at least two, interfacing, prefabricated, fiber-reinforced thermoplastic composite parts, the parts being in registration to define the bond line, comprising:
a fluid pressure chamber in contact with at least one part for applying a substantially uniform pressure along the bond line;
(b) an induction coil in the chamber for generating a magnetic field to heat and soften the parts at the bond line to form the thermoplastic weld;
(c) an electrical power source coupled to the coil to energize the coil to generate the magnetic field; and
(d) motive means associated with the coil for moving the coil in the chamber over the bond line.

16. The tooling of claim 15 wherein the fluid is water.

17. The tooling of claim 15 wherein the chamber is a flexible hose.

18. The tooling of claim 15 further comprising a susceptor positioned between the parts along the bond line for heating by receiving energy from the magnetic field.

19. A process for forming a thermoplastic weld along a bond line along an interface between at least two fiber-reinforced thermoplastic composite parts, comprising the steps of:
(a) assembling the parts to define the bond line;
(b) applying a substantially uniform pressure to the entire bond line by exerting pressure with a pressurized liquid to at least one part; and
(c) moving an energized induction coil over the surface of one part while applying the pressure, the coil generating a magnetic field that heats and softens the parts along the bond line to form the thermoplastic weld.

20. The process of claim 19 further comprising the step of:
positioning a susceptor between the parts along the bond line, the susceptor receiving the magnetic field and producing eddy current to heat the parts.

* * * * *